United States Patent [19]
Goreham

[11] Patent Number: 4,924,622
[45] Date of Patent: May 15, 1990

[54] BAIT PROTECTOR

[76] Inventor: Wordlow Goreham, P.O. Box 26, Woods Harbour, Shelburne County, Nova Scotia, Canada, B0W 2E0

[21] Appl. No.: 360,096

[22] Filed: Jun. 1, 1989

[51] Int. Cl.⁵ .............................................. A01K 69/06
[52] U.S. Cl. ....................................... 43/100; 43/102
[58] Field of Search ................. 43/100, 101, 102, 103, 43/104, 105

[56] References Cited

U.S. PATENT DOCUMENTS

| | | | |
|---|---|---|---|
| 3,232,000 | 2/1966 | Gale | 43/100 |
| 4,177,601 | 12/1979 | Morton | 43/103 |
| 4,184,283 | 1/1980 | Wyman | 43/102 |
| 4,409,752 | 10/1983 | Anderson | 43/105 |
| 4,821,451 | 4/1989 | Matson | 43/105 |
| 4,843,756 | 7/1989 | Wyman et al. | 43/102 |

Primary Examiner—Richard K. Seidel
Assistant Examiner—James Miner
Attorney, Agent, or Firm—Burke-Robertson

[57] ABSTRACT

A device for protecting bait impaled on a spike within a lobster trap or the like. The device comprises a flat body having a centrally disposed spike-receiving aperture for seating the device on the spike above the bait when impaled thereon. A plurality of protector spikes with sharpened points are secured to the body, the spikes downwardly and outwardly oriented about the body when seated on the spike. The device is particularly well-suited to deter seals from stealing the bait from within the trap.

11 Claims, 1 Drawing Sheet

BAIT PROTECTOR

The present invention relates to a device for protecting the bait impaled on a spike within a lobster trap or the like, and more particularly for protecting such bait from being stolen by seals or other sea animals.

BACKGROUND OF THE INVENTION

In the traditional lobster trap which is made of wood and which has a spike in the centre upon which is placed a bag containing bait, seals are a constant nuisance in that they readily steal the bait bag after the trap has been placed in the water. Seals are able to insert their snouts through the openings of the side heads of the lobster trap. Being very intelligent animals, they have learned to push the bait bag up, clear of the spike, and then extract the bag from the lobster trap. Some seals have even learned to open the door of the trap to gain better access to the bait bag. Indeed, it is regarded as an ill omen by lobster fisherman if they see a seal when they are setting their trap lines, as, more often than not, the seal will await the departure of the fisherman and then plunder the bait bag, in sequence, from each trap along the line.

It is an object of the present invention to provide a device which will protect the bait bag, when it has been impaled on the spike within the trap, against being stolen by seals.

SUMMARY OF THE INVENTION

In accordance with the present invention, the device comprises a flat body having a centrally disposed spike receiving aperture for seating the device on the spike above the bait when impaled thereon. A plurality of protector spikes with sharpened points are secured to the body, the spikes downwardly and outwardly oriented about the body when seated on the spike.

In a preferred embodiment of the present invention, the disk is circular in shape and the protector spikes are peripherally seated about the edge of the disk, the spikes extending outwardly and downwardly from the body at an angle of about 45°. A friction means is preferably associated with the aperture to cooperate with the spike and prevent the device from being unpurposefully removed from the spike.

The device in accordance with the present invention has proven extremely effective in discouraging seals from pirating bait bags impaled on spikes within traps, as will be described in more detail hereinafter.

BRIEF DESCRIPTION OF THE DRAWINGS

These and other objects and advantages of the invention will become apparent upon reading the following detailed description and upon referring to the drawings in which.

Figure 1:
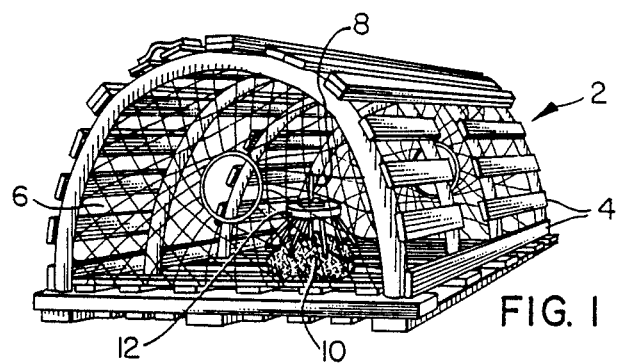
FIG. 1 is a schematic, perspective view of a conventional trap having a bait protector mounted therein in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a conventional lobster trap 2 having, inter alia, a frame 4, side heads 6 and a spike 8 on which a bait bag 10, for attracting lobsters into the trap, is impaled.

Seated on spike 8 is a bait protector device 12 in accordance with the present invention. Device 12 comprises a flat, disk-like body 14 having a centrally disposed aperture 16 to which spike 8 protrudes when device 12 is seated thereon.

Figure 2:
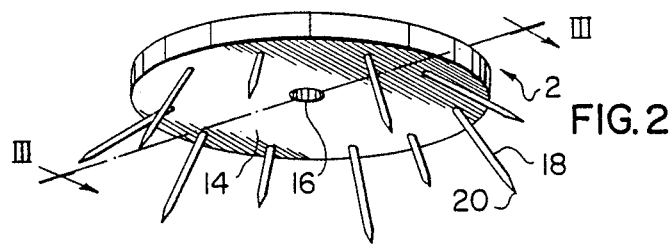
FIG. 2 is a perspective view of the device of FIG. 1.
Figure 3:
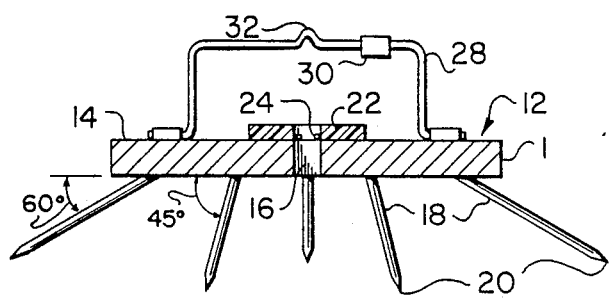
FIG. 3 is an elevation view in section taken along III—III of FIG. 2.

A plurality of sharpened protector spikes 18 are secured to and peripherally spaced about body 14, protector spikes 18 being downwardly and outwardly oriented (FIG. 2) with respect to spike 8 when body 14 is seated thereon. It is preferred to stagger the angle of spikes 18 with respect to the axis of spike 8 when body 14 is seated thereon, between about 45° to about 65° as illustrated. In other words, one protector spike 18 will have a 45° angle with respect to that axis of spike 8, and its adjacent protector spike 18 an angle of 60°, its adjacent spike an angle of 45° etcetera, about the body 14 of device 12. It has been found that such staggered angles are more effective in stopping seals from dislodging device 12 from spike 8 to remove bait bag 10 from that spike, than if the spikes were positioned all the same angle, for example 45°. The angles at which protector spikes 18 are positioned in body 14 are important, since if the angles were all greater than 45°, a seal could put more upward pressure with its flippers on device 12 to lift it from spike 8; if the angles were less than 45°, so that the spikes were more vertically aligned with respect to spike 8, a seal might have easier access to the bait bag 10, with its snout. Body 14 may be made of wood and spikes 18 of galvanized steel, or, preferably, may be integrally made from a sturdy plastic material. The sharpened ends 20 of protector spikes 18 are sharper than for example galvanized steel spikes would be, to ensure that the tough skin of a seal, on its snout or flipper, cannot be used to lift device 12 upwardly on spike 8, to remove it therefrom.

To facilitate holding device 12 on spike 8 against unpurposeful removal other than by for example the lobster fisherman operating the trap, an appropriate friction means such a rubber pad 22 is provided. Pad 22 is secured to the body 14 over aperture 16, and has its own aperture 24 aligned with aperture 16 through which spike 8 passes when device 12 is appropriately seatably positioned on spike 8. In this manner the inner sides of aperture 24 provide the necessary frictional engagement with spike 8 to prevent device 12 from being unpurposefully removed.

Figure 4:
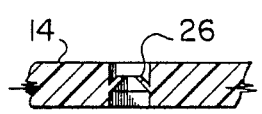
FIG. 4 is a similar, elevation view in section plan view of a portion of an alternative embodiment of the device in accordance with the present invention.
Figure 5:
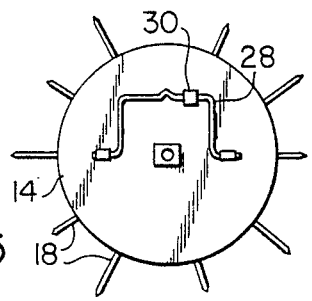
FIG. 5 is a top plan view of the device of FIG. 1.

In the alternative embodiment illustrated partially in FIG. 4, this friction means (for example if the body and protector spikes are made of plastic) may take the form of angled rim 26 about the inside surface of aperture 16 to frictionally engage the spike.

To facilitate removal of device 12 from its seated position on spike 8, it is preferred to have a fold-down handle 28 fastened to the upper surface of body 14 as illustrated. The handle may be secured and hinged to that surface by any appropriate means. A grip means such as a rubber strip 30 may be secured to the edge of handle 28 to facilitate lifting of handle 28 into a vertical position with respect to the upper surface of body 14 when the device is to be removed from spike 8. Again, because of the intelligence of seals, it is important to ensure that the handle is designed for use only by humans so that the seals cannot learn to use such handle. A notch 32 may be provided at the top of handle 28 to provide clearance for the upper portion of spike 8 when the handle is in vertical position.

The sharpened protector spikes 18 of the device in accordance with the present invention effectively circumscribe bait bag 10, when device 12 is in position on spike 8, thereby making it painful for a seal attempting to dislodge bait bag 10 from its position on spike 8 and discouraging the seal from attempting such action.

Thus it is apparent that there has been provided in accordance with the present invention a bait protector device for a lobster trap or the like that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a shellfish trap, a device for protecting bait impaled on a spike within said trap, said or the like, the device comprising a flat body having a centrally disposed spike receiving aperture for seating the device on the spike above the bait when impaled thereon, and a plurality of protector spikes secured to the body, the protector spikes downwardly and outwardly oriented about the body when seated on the spike.

2. A device according to claim 1 wherein the flat body is circular.

3. A device according to claim 2 wherein the protector spikes are peripherally seated about the edge of the body.

4. A device according to claim 1 wherein the body is made of plastic.

5. A device according to claim 1 wherein the body and the protector spikes are integral and made from plastic.

6. A device according to claim 1 wherein the protector spikes extend outwardly and downwardly from the body at an angle of about 45°.

7. A device according to claim wherein the protector spikes extend outwardly and downwardly from the body at angles of about 45° and 65°, with respect to the axis of the bait and paling spike when the device is seated thereon, the adjacent protector spikes being angled alternatively at 45° and 65° about the body.

8. A device according to claim 1 wherein a friction means is associated with the aperture to prevent the device from being unpurposefully removed from the spike.

9. A device according to claim 8 wherein the friction means is a rubber pad secured to the body, the pad having an aperture aligned with that of the body whereby, when the device is seated on the spike, the sides of the aperture of the pad frictionally engage the spike.

10. A device according to claim 8 wherein the body is of plastic and the friction means comprises an angled rim about the inner surface of the aperture, the rim to frictionally engage the spike.

11. A device according to claim 1 further provided with a handle secured to the upper surface of the body, the handle being hinged thereto to move between a fold-down position resting on that surface and an operative position vertically disposed with respect thereto to facilitate removal of the device when seated on the bait and paling spike.

* * * * *